United States Patent
Rose et al.

(10) Patent No.: US 11,976,703 B2
(45) Date of Patent: May 7, 2024

(54) BEARING AND BEARING ARRANGEMENT

(71) Applicant: Vibracoustic SE, Darmstadt (DE)

(72) Inventors: David Rose, Hamburg (DE); Jakob Friess, Hamburg (DE); Daniel Renz, Bardowick (DE); Philipp Werner, Lueneburg (DE)

(73) Assignee: Vibracoustic SE, Darmstadt (DE)

(*) Notice: Subject to any disclaimer, the term of this patent is extended or adjusted under 35 U.S.C. 154(b) by 119 days.

(21) Appl. No.: 17/496,499

(22) Filed: Oct. 7, 2021

(65) Prior Publication Data

US 2022/0112936 A1    Apr. 14, 2022

(30) Foreign Application Priority Data

Oct. 9, 2020  (DE) .......................... 102020126561.1

(51) Int. Cl.
*F16F 15/08*    (2006.01)
*F16F 3/087*    (2006.01)

(52) U.S. Cl.
CPC ............ *F16F 15/08* (2013.01); *F16F 3/0876* (2013.01)

(58) Field of Classification Search
CPC .......... F16F 15/08; F16F 3/0876; F16F 7/128; F16F 1/3605; F16F 1/376; F16F 1/3735
USPC ........................................................ 248/635
See application file for complete search history.

(56) References Cited

U.S. PATENT DOCUMENTS

| | | | | |
|---|---|---|---|---|
| 2,386,463 A | * | 10/1945 | Hile ...................... | F16F 3/0873 267/140.5 |
| 2,686,667 A | * | 8/1954 | Willison ................. | B61G 9/14 213/40 D |
| 2,713,485 A | * | 7/1955 | Tillou ..................... | F16F 1/403 267/141.1 |
| 4,002,315 A | * | 1/1977 | Van Goubergen ...... | F16F 3/093 248/633 |
| 5,133,617 A | * | 7/1992 | Sokn ....................... | F16F 15/08 403/348 |
| 5,799,930 A | * | 9/1998 | Willett .................... | F16F 3/093 267/141.5 |

(Continued)

FOREIGN PATENT DOCUMENTS

| | | |
|---|---|---|
| DE | 19500975 A1 | 7/1995 |
| DE | 102005010433 A1 | 9/2006 |

(Continued)

OTHER PUBLICATIONS

German Office Action, 10 2020 126 561.1, dated Apr. 20, 2021 with google machine translation.

*Primary Examiner* — Terrell L McKinnon
*Assistant Examiner* — Michael McDuffie
(74) *Attorney, Agent, or Firm* — Fishman Stewart PLLC

(57) ABSTRACT

A bearing provides a vibration-insulating mount on a first component with a hole through which a central longitudinal axis extends. The bearing includes a first bearing part with a first fixing structure that can be arranged on one side of the first component, and a second bearing part with a second fixing structure that can be arranged on the other side of the first component. In embodiments, the first fixing structure comprises first pins that can protrude into the hole, and the second fixing structure comprises second pins that can protrude into the hole. In embodiments, at least one of the pins of each fixing structure is biased or is able to be biased radially outwards with respect to the central longitudinal axis.

12 Claims, 7 Drawing Sheets

(56) References Cited

U.S. PATENT DOCUMENTS

| | | | |
|---|---|---|---|
| 7,394,009 B2* | 7/2008 | Judd | G10D 13/28 |
| | | | 84/411 R |
| 9,920,811 B1* | 3/2018 | Morrison | F16F 15/08 |
| 10,274,036 B2* | 4/2019 | Al-Dahhan | F16F 1/376 |
| 10,962,165 B2* | 3/2021 | Weng | F16M 11/041 |
| 11,255,362 B2* | 2/2022 | VanHuis | B62D 25/24 |
| 11,365,780 B2* | 6/2022 | Düll | F16F 1/376 |
| 2020/0355238 A1 | 11/2020 | Dull et al. | |
| 2022/0339986 A1* | 10/2022 | Chen | F16F 3/093 |

FOREIGN PATENT DOCUMENTS

| | | |
|---|---|---|
| DE | 102019113663 A1 | 11/2020 |
| WO | 20-114600 A1 | 6/2020 |

* cited by examiner

BEARING AND BEARING ARRANGEMENT

CROSS-REFERENCE TO RELATED APPLICATIONS

This application claims priority to German Patent Application No. DE 10 2020 126 561.1, filed Oct. 9, 2020, the contents of which are hereby incorporated by reference in its entirety.

TECHNICAL FIELD

The invention relates to a bearing and a bearing arrangement.

BACKGROUND

Bearings which are attached to a first component in a manner which provides insulation from vibrations are known. For example, WO 2020/114600 A1 discloses a first type of bearing for mounting a compressor on a refrigerator in a manner which provides insulation from vibrations. In this case, rubber buffers are joined into metal sheets, and consist of a buffer positioned on an upper side of the metal sheet, a bridging structure protruding through a hole of the metal sheet—for example, a short, round web made of elastomer—and a holding structure on the underside of the metal sheet, for example a conical geometry squeezed through the opening with an oversized portion. However, since the lower axial buffer and/or the holding structure must be joined through the opening on the underside of the metal sheet, it cannot be designed to be as large as desired. This leads to considerable restrictions in the degree of design freedom for the lower buffer or the holding structure.

There are also known second types of bearings in which a screw is used to fix a component, and protrudes through a hole. However, it is important to ensure that there is sufficient decoupling. This construction is typically complex, since no bearing can be pressed into a simple hole in a metal sheet. The fixation on the metal sheet and the decoupling must be designed separately. Disadvantages are the complex construction of the bearing and the multiple screw connections required.

In the case of a third type of bearing, two mostly identical bearing halves can enclose a frame, and then mount said frame on a further component via a screw connection. If the frame is sufficiently thick, identical buffers can be installed from above and below. However, this option does not apply to installation in a hole in a metal sheet. The disadvantage of such a mount is that the frame must have a sufficient thickness so that both bearing halves can be held in the hole both from above and from below; however, this is usually not the case with metal sheet.

SUMMARY

In summary, the known bearing types therefore have several disadvantages. Regarding the first type of bearing: Since the holding structure has to be pressed through the hole on the side facing away from the buffer, it cannot be designed to be as large as desired. This means that the holding structure itself can only be used as a buffer to a limited extent. This means that the bearing only works on one side. Regarding the second type of bearing: Due to the separate construction of the fixation and the decoupling, several components and a more complex installation are necessary. Regarding the third bearing type: the metal sheet being mounted must have a sufficient thickness so that both halves of the bearing can be held in the hole from above as well as from below—which is not the case with metal sheet.

The invention is therefore based on the object of creating a bearing which overcomes the problems of the prior art. In particular, it should be possible to design the bearing and its dimensions at any size. The size of the bearing or a holding structure should not be limited by the installation process, such as a process of squeezing through the installation hole. In addition, the bearing should be inexpensive to manufacture and install. In addition, a bearing should be created which also enables installation on a thin metal sheet as a component. In addition, the bearing should enable radial free travel, relative to an installation hole, and at the same time be able to direct radial forces into the installation hole. The bearing should act on both sides in the axial direction, and be easy to install.

Primary features of the invention are disclosed along with refinements.

According to the invention, a bearing is proposed to provide a vibration-insulating mount on a first component, with a hole through which a central longitudinal axis extends, comprising a first bearing part with a first fixing structure which can be arranged on one side of the first component, and comprising a second bearing part with a second fixing structure which can be arranged on the other side of the first component, wherein the first fixing structure comprises first pins that can protrude into the hole, and the second fixing structure comprises second pins that can protrude into the hole, wherein at least one of the pins of each fixing structure is biased or can be biased radially outward with respect to the central longitudinal axis.

The pins of the two fixing structures can be biased, for example, by resting against each other and generate a bias or locking by means of a form fit, force fit or friction fit. At least the pins of one of the two fixing structures, preferably the pins of both fixing structures, can be designed in such a way that they can protrude into the hole when installed on the first component, and build up a radial bias so that the two bearing parts are fixed in the hole. The bearing can therefore be used to mount the first component on a second component in a vibration-insulating manner.

The first component can be a plate element or a metal sheet. The bearing can be designed in such a way that, in the installation position on the first component, the first pins and/or the second pins protrude into the hole. The assembled state of the bearing means that both bearing parts are fastened to each other via their fixing structures, or rest against each other. The installation position of the bearing means that the bearing is installed on at least one component.

It can be contemplated that the first and second pins are each arranged alternately in the circumferential direction with respect to the central longitudinal axis. They can therefore engage with each other in alternation, and therefore lead to an interlock of the two bearing parts. The interlock can be made in the installation hole itself. An interlock means the overlapping of identical or comparable elements in the transverse direction with respect to the central longitudinal axis. In the installation position on the first component, the pins can, as it were, engage in the hole alternately and from both sides. However, it is also conceivable that only one side can engage in the hole, only via the pins of one of the two fixing structures. The radial bias or bias capacity of the pins of at least one fixing structure in the hole creates a jamming, and thus a fixation of both bearing parts in the hole.

A through-hole extending in the axial direction can bound the pins radially on the outside thereof. A fastening means can be guided through this through-hole in order to connect the bearing to at least one component, for example a pipe. As a result, it is not necessary to use a plurality of screws; rather, the fixation of the bearing on the first and/or second component can be achieved with just one single fastening means, such as a screw, for example.

According to a further development of the bearing according to the invention, a pin gap can be formed between at least two pins of a fixing structure in the circumferential direction with respect to the central longitudinal axis. A pin of the other fixing structure can protrude into this pin gap. The pins of the one fixing structure thus form at least a portion of the pin gap for the pins of the other fixing structure. The protruding pin can advantageously be in contact with the two pins forming the pin gap, for example with a press fit and/or form fit. Therefore, for the purpose of fixing the two bearing parts to each other, there is no need to provide any further element which fixes the pins. In this embodiment, the pins of one fixing structure can particularly fix the pins of the other fixing structure, and vice versa.

According to a further development, in the bearing according to the invention, the pin gaps in each of the bearing parts can extend in the direction of the central longitudinal axis, all the way to a gap base, or can be designed without limit stops in the direction of the central longitudinal axis. Each bearing part can comprise a gap base. The gap base delimits the gap in the transverse direction with respect to the central longitudinal axis. A gap base is advantageous when a maximum penetration depth of pins into the corresponding gap will be predefined. The two bearing parts then also have a defined interlock depth. In such a case, the thickness of the component in the region of the hole can be a length in the axial direction between the gap base and a free end of the corresponding pin. The thickness of the component can also be greater, but the free ends of the pins would then no longer rest on the respective gap bases—as a result of which, the strength of the seat in the hole can be impaired. Alternatively, one of the two bearing parts, preferably both, can have no gap bases—the gaps are therefore designed without limit stops. The free ends of the pins themselves cannot then come into contact with an element which limits an axial path. In this case, the bearing is less dependent on the thickness of the component in the region of the hole. The axial length of the pins should, however, be such that they can rest against each other at least in the circumferential direction—in the installed state and/or in the installation position on the component.

A configuration of the bearing according to the invention is conceivable in which the pins rest against each other and/or can engage in each other in order to produce a press fit and/or form fit between the two bearing parts. The pins themselves, which can protrude into the hole, can thus be shaped and/or dimensioned in such a way that they implement a press fit and/or a form fit. It can be contemplated that the pins of both fixing structures are in operative connection with each other and, in addition to the radial clamping, can mutually fix each other in the circumferential direction, for example by a press fit in the circumferential direction and/or by a snap-on connection in the circumferential direction. This results in an additional fixation. It can be contemplated that the pins of one fixing structure, preferably the pins of both fixing structures, have an oversize portion in the circumferential direction with respect to the corresponding gaps of the other fixing structure. As a result, a bias can be established in the installed state or in the installation position. In this way, the functions of "vibration decoupling" and "fixing" of a component can be combined, although only a simple installation hole is available in a component, such as a metal sheet, to support the radial and axial forces.

According to a further development, the pins in the bearing can have side walls arranged in the circumferential direction, which lie in a longitudinal sectional plane with the central longitudinal axis, or which are tilted with respect to the central longitudinal axis. If the side walls lie in the given longitudinal sectional plane, the side walls of the pins run in the axial direction. In this variant, the thickness of the component in the region of the hole is of secondary importance, since a press fit can be achieved even with a small interlock depth. In the second variant, the side walls can be tilted in the circumferential direction and/or in the radial direction. The pins can be conical in this case. The consequence of this variant is that the two bearing parts can be assembled or installed with little effort, since a contact and a press fit of alternating pins only takes place at a greater interlock depth.

According to a further development of the bearing according to the invention, at least one pin of a fixing structure can comprise at least one elastomer rib on the radially outer side and/or one elastomer rib on the radially inner side. Preferably, all pins of one fixing structure, and more preferably of both fixing structures, comprise at least one elastomer rib on the outside and/or one elastomer rib on the inside. The outside and/or inside rib can run in the axial direction. The radially outer elastomer rib significantly improves the radial bias and improves the ability of the bearing to be fixed in the hole. In addition, a bearing with at least one elastomer rib on the outside can be better pressed into the hole compared to a bearing without such a rib. The radially inner elastomer rib can rest on a tube which can protrude through the bearing. It can be contemplated that the pins of at least one fixation structure, and preferably of both fixation structures, are coated in the axial direction and/or in the circumferential direction with an elastomer layer which supports/optimizes the fixation through an increased coefficient of friction and an additional spring effect. The elastomer layer of the pins allows a relative movement for decoupling between the pin structure and the component to take place. The pins can also be formed from an elastomeric material.

An embodiment of the bearing according to the invention can provide that at least one fixing structure has a stiffening means, preferably a stiffening ring, a pin stiffener of which extends at least into one pin. The stiffening means leads to high torsional stiffness and to a tight fit of both bearing parts. If a pin stiffener is present, this advantage also applies to the corresponding pin. The stiffening means can lead to a stronger bias capacity or biasing in the radial direction and/or in the circumferential direction. In particular, if the pin stiffeners of both fixing structures also interlock in the axial direction, they can protrude into the hole and support themselves against the edge of the hole in order to generate a pretension. The stiffening means can therefore be designed in the manner of a crown. It can be contemplated that the cross sections of the pin stiffeners each have the shape of a circular ring segment, and preferably all the pin stiffeners of a fixing structure lie on an identical circular ring, and more preferably all the pin stiffeners of both fixing structures lie on an identical circular ring. In this case, the pin stiffeners can in particular best mutually support each other in the circumferential direction and generate a circumferential bias. It can be contemplated that a pin stiffener of a stiffening means, preferably all pin stiffeners of the stiffening means, more preferably all pin stiffeners of both stiffening means, run with a tilt with respect to the central longitudinal axis. The free ends of the pin stiffeners can be tilted towards the central longitudinal axis, and/or can also be tilted away from the same. Tilting away from the central longitudinal axis can increase the bias capacity, since pin stiffeners can, for example, exert a greater force on the edge of the hole. The stiffening means can penetrate the at least one gap base in the transverse direction, and/or form it, and/or comprise an elastomer layer there. The stiffening means can be formed from a plastics material or metal.

According to a further development, in the bearing, the at least one pin stiffener can have an elastomer layer on the radial outside and/or radial inside, and/or at least on one side in the circumferential direction. The elastomer layer can be the elastomer from which the corresponding pin can be formed. This elastomer layer can also comprise or form the at least one rib. It can be contemplated that the bearing parts are formed from an elastomer material.

According to a further embodiment of the bearing according to the invention, the pins of the two fixing structures can each be designed to be equally spaced from each other with respect to the central longitudinal axis. The pins of one fixing structure then have the same distances from each other as the pins of the other fixing structure. The pin gaps of one fixing structure preferably have the same axial lengths and/or the same widths or circular arc lengths with respect to the central longitudinal axis. This preferably applies to both fixing structures. In that case, the orientation of the two bearing parts relative to each other plays a secondary role during the assembly or installation on the component, since several orientations are possible. The number of orientations can then be a function of the number of pins and gaps formed. The pins of each fixing structure can be part of a segmented ring that extends around the central longitudinal axis. Each segment can be represented by a pin. An embodiment in which the geometry of the fixing devices of both bearing parts is identical is also advantageous. The two bearing parts also advantageously have identical geometries. In this case, the manufacturing outlay is considerably reduced, since the bearing parts are designed as identical parts.

It can be contemplated that the bearing comprises a tube which passes through the two bearing parts along the central longitudinal axis and rests against the pins. The tube can bias the pins radially outward.

A bearing arrangement is also proposed, comprising a bearing according to the invention, a tube which is guided along the central longitudinal axis through at least one through-hole formed by the pins, and a stop means which rests against an axially outer side of one of the bearing parts and is connected to the tube. The connection can be a screw connection. By using a stop means, such as a stop plate, which can be screwed together with a second component, such as a compressor, it is also possible to axially bias the two buffer halves and/or to press them together. This accordingly prevents the two pin geometries from separating and/or slipping off each other during operation.

It can also be contemplated to use such a bearing or such a bearing arrangement for mounting a compressor on a vehicle, preferably a vehicle frame, and more preferably on a semi-truck frame. The compressor can be a second component.

BRIEF DESCRIPTION OF THE DRAWINGS

Further features, details and advantages of the invention emerge from the wording of the claims, and from the following description of embodiments with reference to the schematic drawings, wherein:

DETAILED DESCRIPTION

In the figures, elements that are the same or that correspond to each other are each denoted by the same reference symbols, and are therefore not described again unless expedient. Features that have already been described are not described again in order to avoid repetition, and can be applied to all elements with the same or corresponding reference symbols, unless explicitly excluded. The disclosures contained in the entire description can be applied analogously to the same parts with the same reference symbols or the same component names. The location details chosen in the description, such as above, below, laterally, etc. relate to the figure immediately described and shown, and are to be transferred accordingly to the new position in the event of a change in position. Furthermore, individual features or combinations of features from the different embodiments shown and described can also represent independent, inventive solutions or solutions according to the invention.

Figure 1:
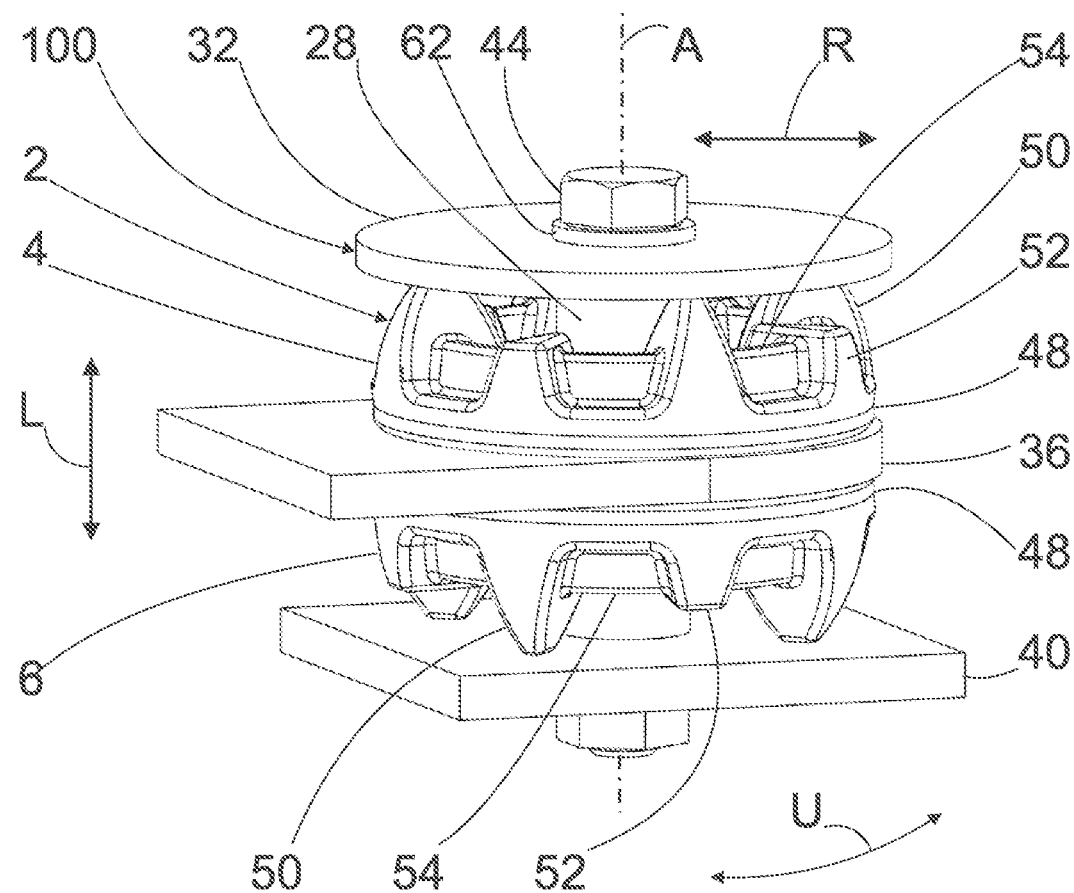
FIG. 1 is a perspective view of a bearing arrangement according to the invention.

FIG. 1 shows a bearing arrangement 100 which supports a first component 36 comprising an installation hole 38, such as a metal sheet or a support structure, on a second component 40, such as a compressor or its connection structure. For this purpose, the bearing arrangement 100 comprises a bearing 2 with two bearing parts 4, 6 designed as identical parts. These have a radial direction R, and through them passes a central longitudinal axis A. The two bearing parts 4, 6 are designed as elastomer bearing parts, and clamp the first component 36 between them. The bearing arrangement 100 also includes a stop means 32, which rests on the bearing part 4 and is designed as a stop disk. The stop means 32, together with a tube 28, is screwed to the second component 40 by means of a screw 44 and a washer 62. The tube 28 is guided centrally through a through-hole 30 of each of the two bearing parts 4, 6, and is elastically supported in these through-holes 30 via elastomer ribs 20 on the radially inner side. Both bearing parts 4, 6 are slightly biased axially against each other, and are connected to the first component 36 by means of a press fit.

Each of the two bearing parts 4, 6 has a disk-shaped base body 48. The base bodies 48 each lie against the first component 36 via a contact surface 60 on both sides of the installation recess 38. Starting from the base body 48, in the circumferential direction U, long support pads 50 and short support pads 52 alternately extend in an axial direction. The support pads 50, 52 are connected via a continuous elastomer ring portion 54 to stiffen the bearing parts 4, 6. The long support pads 50 rest with their free ends on the stop means 32 and/or on the second component 40. The free ends also form axial outer sides 42 of the bearing parts 4, 6. In the axially opposite direction from the support pads 50, 52, pins 12, 14 extend from the base body 48 in the axial direction, as FIG. 2 shows.

Figure 2:
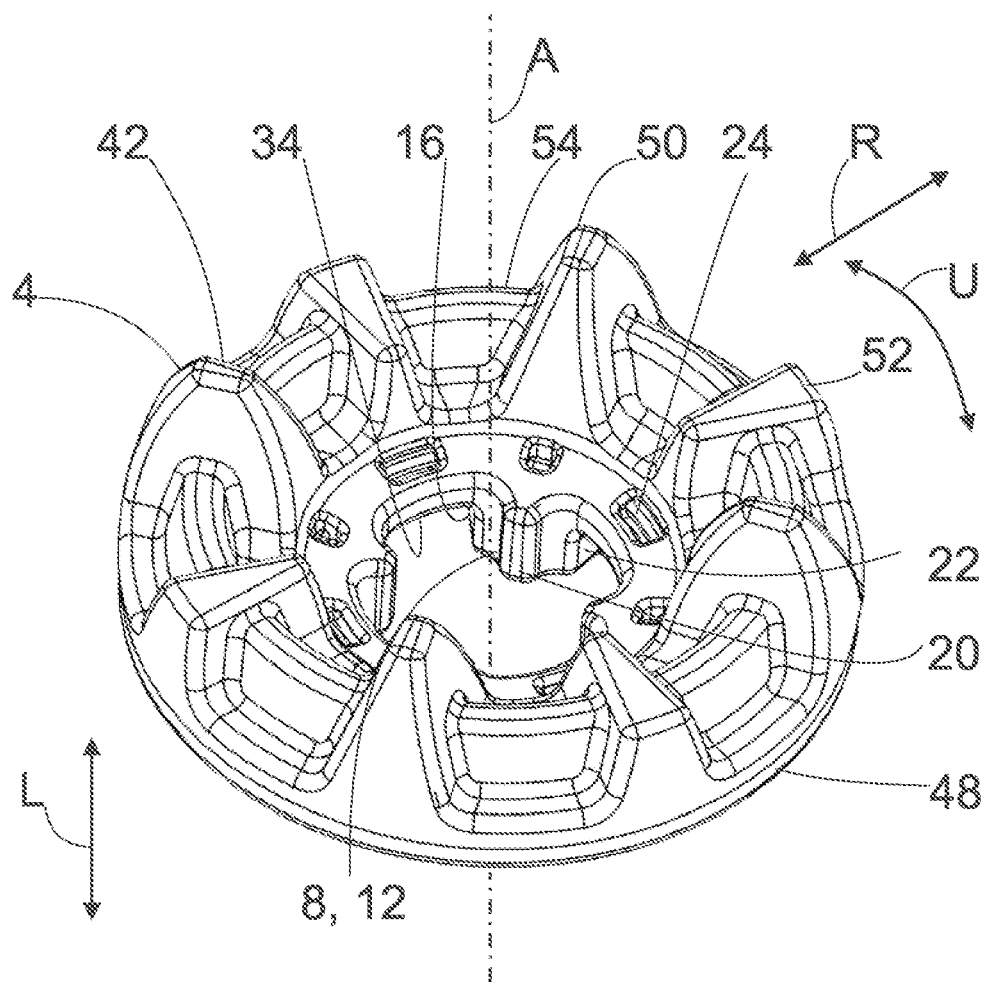
FIG. 2 is a perspective view of a bearing part according to the invention.

FIG. 2 shows the bearing part 4 of the two identical bearing parts 4, 6 in the figures, which also each comprise four identical pins 12, 14 and four identical long support pads 50 and four identical short support pads 52. The long support pads 50 are aligned in the radial direction R with the pins 12, 14. Each of the bearing parts 4, 6 has a fixing structure 8, 10, each fixing structure 8, 10 comprising pins 12, 14. The fixing structures 8, 10 are therefore rotationally symmetrical with respect to the central longitudinal axis, with the number n=4.

Figure 3:
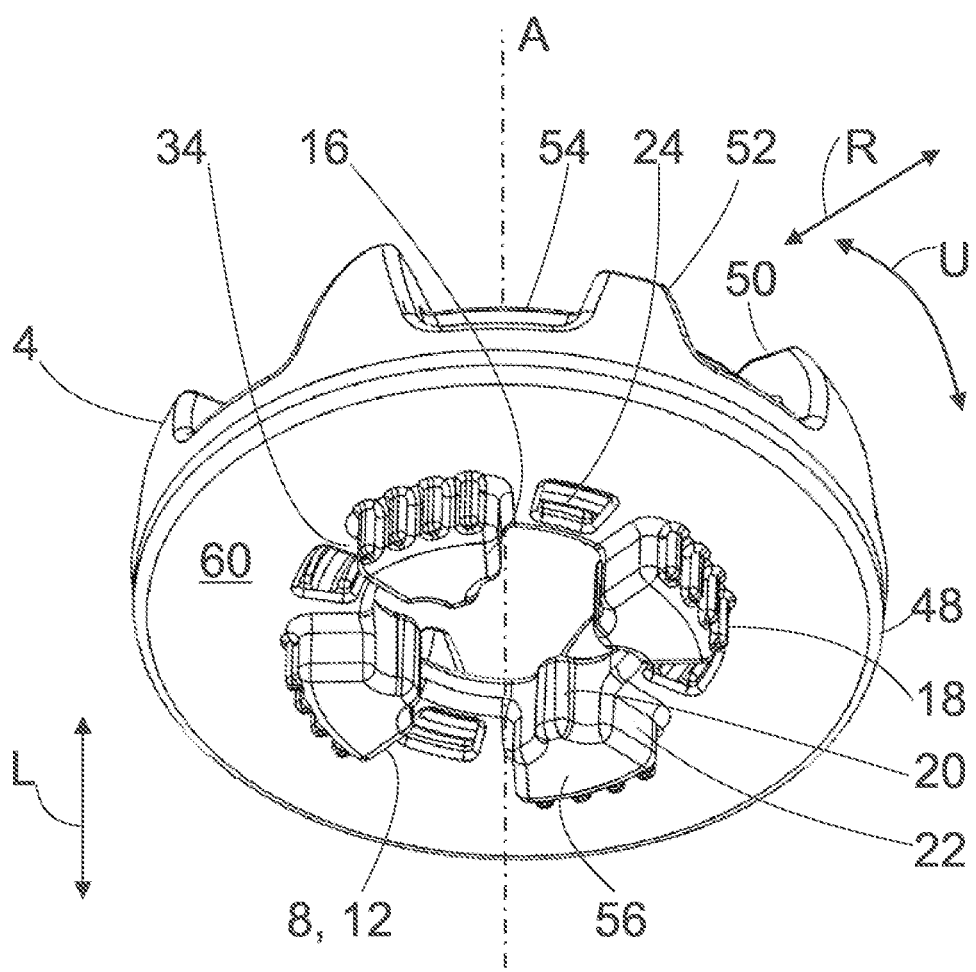
FIG. 3 is a further perspective view of the bearing part according to FIG. 2.

It can be seen from FIG. 3 that each pin 12, 14 has a base body which, in cross section, has the shape of a segment of a circular ring. Proceeding therefrom, one elastomer rib 20 protrudes radially inward, and four elastomer ribs 18 protrude radially outward. In the installation state shown in FIGS. 1 and 4, the outer elastomer ribs 18 rest against the edge of the installation hole 38. In each case, two pins 12, 14 form a pin gap 16 in the gap between them. The pin gap 16 is sized smaller in the circumferential direction U than the extension of the pins 12, 14 in the circumferential direction U, in order to enable a press fit and/or form fit. Each pin gap 16 extends in the axial direction or the longitudinal direction L, starting from the free ends 56 of the pins 12, 14 up to a gap base 34 which is formed by the base body 48. Each pin 12, 14 has side walls 22 lying in the circumferential direction U, which lie in a longitudinal sectional plane E with the central longitudinal axis A, as FIG. 6 also shows.

Figure 4:
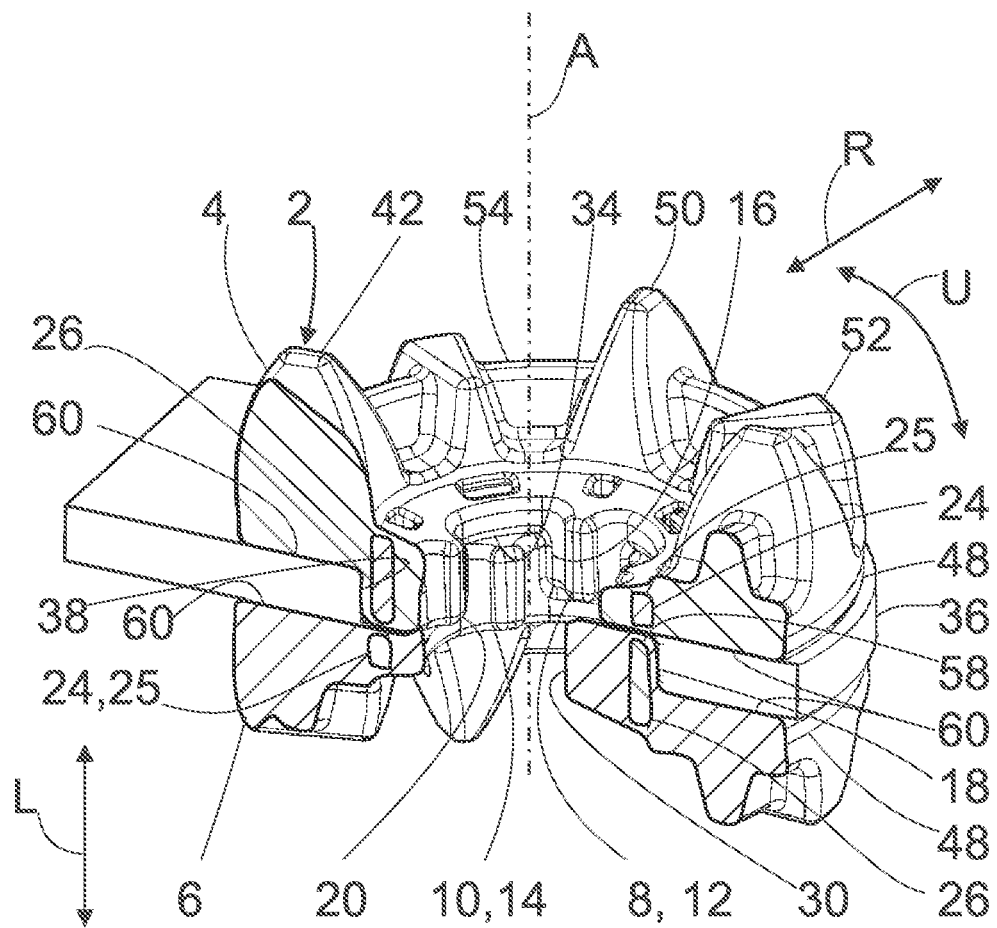
FIG. 4 is a longitudinal sectional view of the bearing arrangement according to FIG. 1.

FIG. 4 shows the interaction of the two bearing parts 4, 6. The first pin 12 of the first bearing part 4 and the second pin 14 of the second bearing part 6 are arranged alternately in the circumferential direction U. Accordingly, they also mesh or interlock with each other and lie against each other in order to create a press fit and/or a form fit between the two bearing parts 4, 6. Each of the pins 12, 14 is received in a pin gap 16 of the other bearing part 4, 6, and is clamped there.

Each fixing structure 8, 10 has a stiffening means designed as a stiffening ring 24. The stiffening means is a metal or plastic part, and comprises pin stiffeners 26. Each pin 12, 14 is provided with a pin stiffener 26. The pin stiffeners 26 extend in the longitudinal direction L starting from a ring base 25, and follow the annular profile of the ring base 25 in their cross section. Each pin stiffener 26 protrudes into the installation hole 38. It can also be seen that the pin stiffeners 26 apply a force acting in the radial direction R to the edge of the installation hole 38.

The pins 12, 14 are pressed into the installation hole 38. A press fit 12, 14 is thereby created on the outer circumference of the pin. The pins 14 of the bearing part 6 are placed from the opposite side into the circumferential gaps of the pins 12, such that the pins 12, 14 are arranged alternately from above and below in the installation hole 38.

The radial bias or bias capacity of at least the pins 12, 14 in the installation hole 38 results in a clamping, and thus a fixation of both bearing parts 4, 6 in the installation hole 38. The ring base 25 of each stiffening ring 24 is arranged in the given bearing part 4, 6 in such a way that, viewed in the longitudinal direction L, it is arranged on one side of the contact surface 60, while the at least one pin stiffener 26 extends to the other side of the contact surface 60. This allows the ring base to be positioned outside of the installation hole 38, to provide a large lever and a tight fit.

Figure 5:
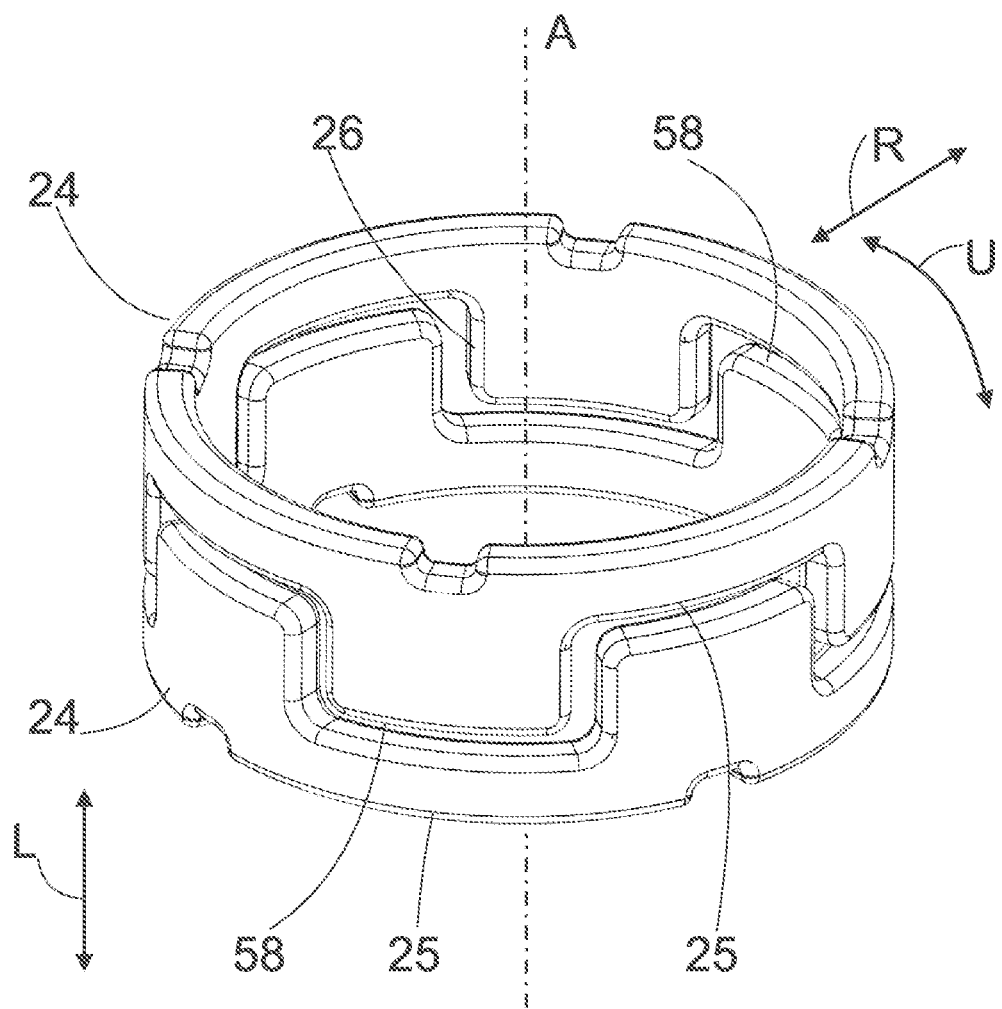
FIG. 5 is a perspective view of two stiffening means of the first embodiment.

FIG. 5 shows the stiffening rings 24 according to the first embodiment, separately. The stiffening rings 24 can be vulcanized into a bearing part 4, 6 as an inlay. Both stiffening rings 24 have an identical geometry. During the installation of the bearing parts 4, 6, the pin stiffeners 26 protrude alternately from above and below into the installation hole 38, thereby providing a certain fixation. Since the pins 12, 14 are also rubberized in the circumferential direction, and are oversized on the circumferential side due to this rubberization, the pin stiffeners 26 mutually support each other and thus lead to a further fixation because the pins 12, 14 cannot tilt radially outward, since they are fixed to the outside through the installation hole 38. Following the interlocking of the pins 12, 14, the pin stiffeners 26, as it were, interlock. Each of the free ends 58 of the pin stiffeners 26 extends towards the other ring base 25. The ring bases 25 extend around the central longitudinal axis A in the shape of a cylinder.

Figure 6:
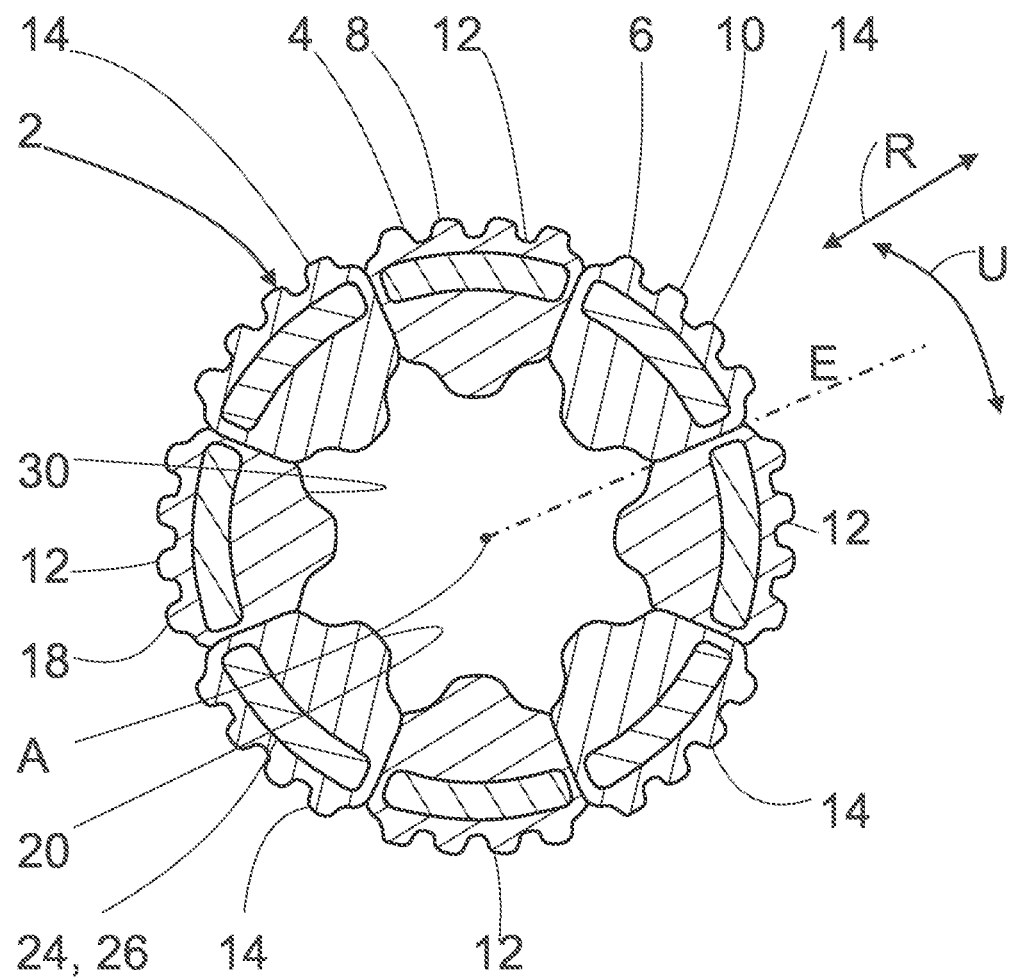
FIG. 6 is a cross-sectional view of the bearing arrangement according to FIG. 1.

FIG. 6 depicts a cross-sectional view through an assembled bearing 2. It can be seen that the pin stiffeners 26 of both stiffening rings 24 lie on an identical circular ring with the center on the central longitudinal axis A. The elastomer ribs 18 are concealed in the radial direction R by the corresponding pin stiffeners 26. The elastomer rib 20 is formed centrally on the pin 12, 14 in the circumferential direction U. The radially inwardly projecting elastomer ribs 20 result in the through-holes 30 being shaped like a star in cross section. Thus, the tube 28 is also supported by means of the star structure.

Figure 7:
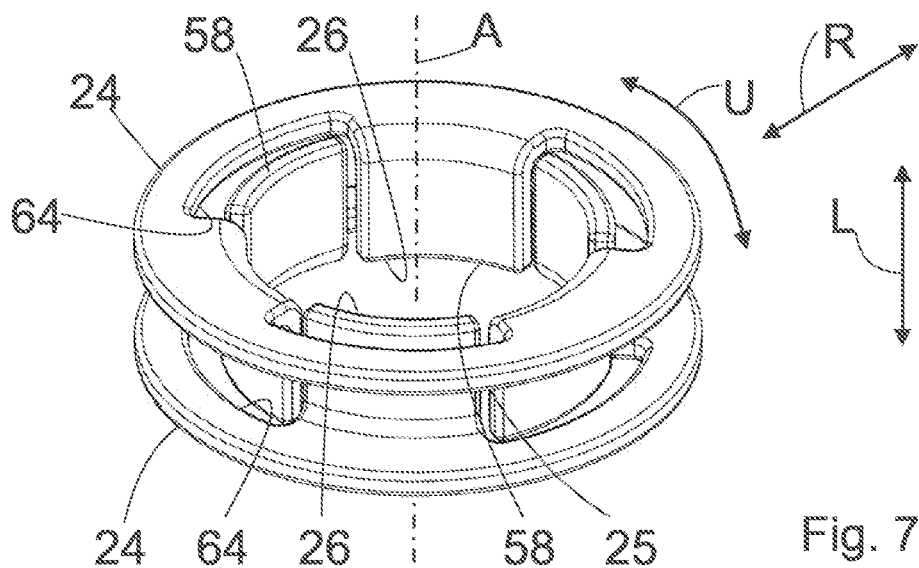
FIG. 7 is a perspective view of two stiffening means of the second embodiment.
Figure 8:
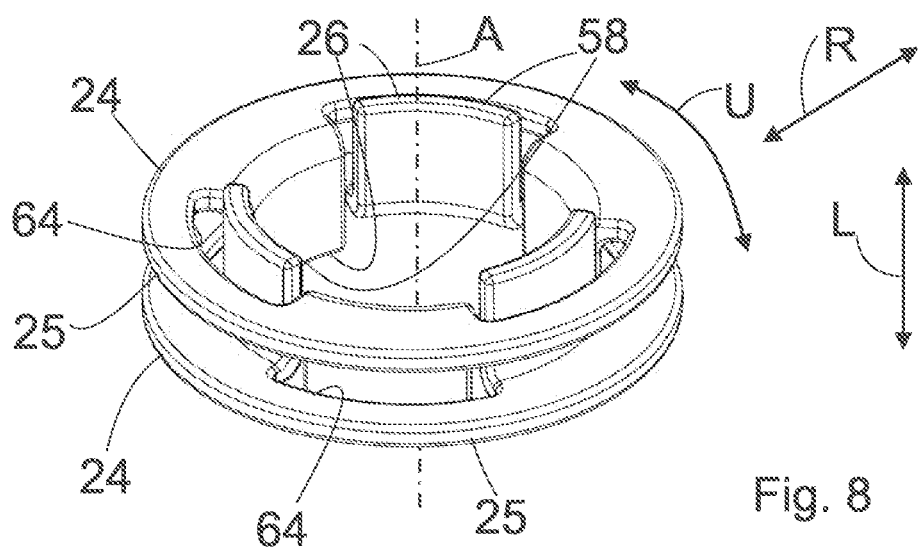
FIG. 8 is a further perspective view of two stiffening means according to the second embodiment.

FIGS. 7 and 8 show the stiffening rings 24 according to the second embodiment separately. The stiffening rings 24 can be vulcanized into a bearing part 4, 6 as an inlay. Both stiffening rings 24 have an identical geometry. During the installation of the bearing parts 4, 6, the pin stiffeners 26 protrude alternately from above and below into the installation hole 38, thereby providing a certain fixation. Since the pins 12, 14 are also rubberized in the circumferential direction, and are oversized on the circumferential side due to this rubberization, the pin stiffeners 26 mutually support each other and thus lead to a further fixation because the pins 12, 14 cannot tilt radially outward, since they are fixed to the outside through the installation hole 38. Following the interlocking of the pins 12, 14, the pin stiffeners 26, as it were, interlock. In the second embodiment, the free ends 58 of the pin stiffeners 26 do not extend towards the respective other ring bases 25, but rather past them tangentially in the longitudinal direction L. This is because the pin gaps 16 in the respective bearing parts 4, 6 do not have a gap base 34 in the direction of the central longitudinal axis A. Rather, they are designed without stops in the direction of the central longitudinal axis A. Each ring base 25 has a passage recess 64 which is open radially inward, and is delimited radially outward by the ring base 25, and in the circumferential direction on both sides by pin stiffeners 26. The ring bases 25 extend around the central longitudinal axis A in the shape of a circular ring.

In FIG. 7, the free ends 58 of one stiffening ring 24 are brought axially level with the ring base 25 of the other stiffening ring 24. In FIG. 8, the free ends 58 of a stiffening ring 24 are positioned axially past the ring base 25 of the other stiffening ring 24. The distance in the longitudinal direction L between the ring bases 25 is then less than the longitudinal extension of the pin stiffeners 26. As a result, the pin stiffeners 26 can interact in the radial direction R not only with the installation hole 38, but also with the other ring base 25.

The invention is not restricted to any of the embodiments described above. It can be modified in many ways. All of the features and advantages arising from the claims, the description and the drawing, including structural details, spatial arrangements and method steps, can be essential to the invention both individually and in a wide variety of combinations.

All combinations of at least two of the features disclosed in the description, the claims and/or the figures fall within the scope of the invention.

To avoid repetition, features disclosed in accordance with the device should also apply and be claimable as disclosed in accordance with the method. Likewise, features disclosed in accordance with the method should apply and be claimable as disclosed in accordance with the device.

The invention claimed is:

1. A bearing to provide a vibration-insulating mount on a first component with a hole through which a central longitudinal axis extends, the bearing comprising:
   a first bearing part with a first fixing structure which can be arranged on one side of the first component, and
   a second bearing part with a second fixing structure which can be arranged on the other side of the first component,
   wherein the first fixing structure comprises first pins which can protrude into the hole, the second fixing structure comprises second pins which can protrude into the hole, at least one fixing structure has a pin stiffener that extends into at least one pin, and at least one of the pins of each fixing structure is biased or is able to be biased radially outwards with respect to the central longitudinal axis.

2. The bearing according to claim 1, wherein a pin gap, into which a pin of the other fixing structure can protrude, is formed at least between two pins of a fixing structure in the circumferential direction with respect to the central longitudinal axis.

3. The bearing according to claim 2, wherein the pin gap in each bearing part extends in the direction of the central longitudinal axis up to a gap base, or is configured without a limit stop in the direction of the central longitudinal axis.

4. The bearing according to claim 1, wherein the pins lie against each other and/or interlock to produce a press fit and/or form fit between the two bearing parts.

5. The bearing according to claim 1, wherein the pins have side walls lying in the circumferential direction, which lie in a longitudinal sectional plane with the central longitudinal axis, or are tilted with respect to the central longitudinal axis.

6. The bearing according to claim 1, wherein the pin stiffener has an elastomer layer on the radial outside and/or radial inside, and/or at least on one side in the circumferential direction.

7. The bearing according to claim 1, wherein the pins of the two fixing structures are each formed equally spaced from each other with respect to the central longitudinal axis.

8. A bearing arrangement, comprising:
   a bearing according to claim 1,
   a tube which is guided along the central longitudinal axis through at least one through-hole formed by the pins, and
   a stop means which rests against an axial outer side of one of the bearing parts and is connected to the tube.

9. A bearing to provide a vibration-insulating mount on a first component with a hole through which a central longitudinal axis extends, the bearing comprising:
   a first bearing part with a first fixing structure which can be arranged on one side of the first component, and
   a second bearing part with a second fixing structure which can be arranged on the other side of the first component,
   wherein the first fixing structure comprises first pins which can protrude into the hole, the second fixing structure comprises second pins which can protrude into the hole; at least one of the pins of each fixing structure is biased or is able to be biased radially outwards with respect to the central longitudinal axis; and at least one pin of a fixing structure comprises at least one elastomer rib on the radially outer side, and/or one elastomer rib on the radially inner side.

10. The bearing according to claim 9, wherein at least one fixing structure has a pin stiffener that extends into at least one pin.

11. The bearing according to claim 9, wherein at least one fixing structure has a stiffening ring.

12. A bearing arrangement, comprising:
    a bearing according to claim 9,
    a tube which is guided along the central longitudinal axis through at least one through-hole formed by the pins, and
    a stop means which rests against an axial outer side of one of the bearing parts and is connected to the tube.

* * * * *